No. 781,998. Patented February 7, 1905.

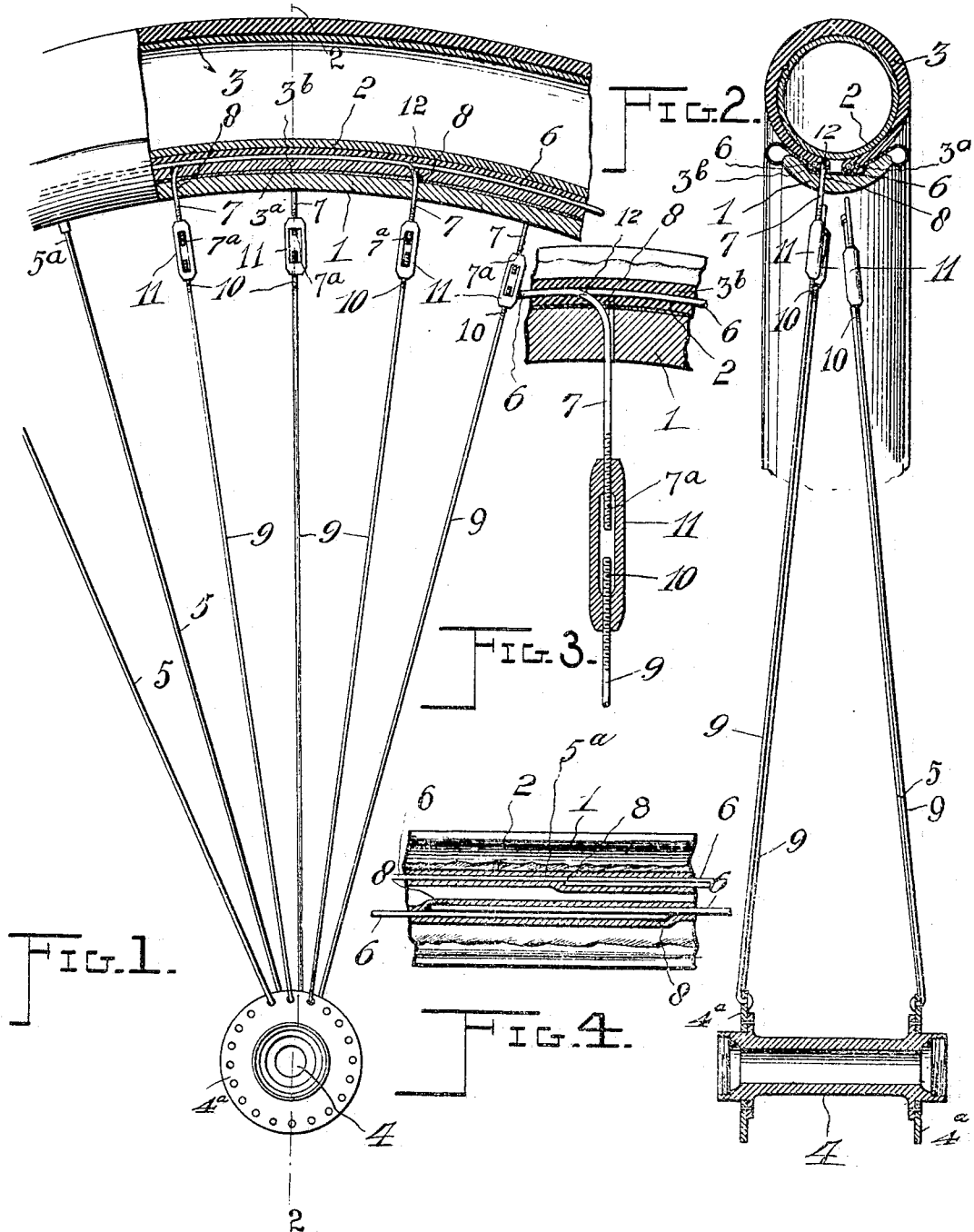

UNITED STATES PATENT OFFICE.

EDWARD BROUGHAM, OF BRANDON, CANADA.

TENSION DEVICE FOR WHEELS.

SPECIFICATION forming part of Letters Patent No. 781,998, dated February 7, 1905.

Application filed May 18, 1904. Serial No. 208,636.

*To all whom it may concern:*

Be it known that I, EDWARD BROUGHAM, a subject of the King of Great Britain, residing at Brandon, in the county of Brandon, Province of Manitoba, Canada, have invented certain new and useful Improvements in Tension Devices for Wheels; and I do hereby declare that the following is a full, clear, and exact description of the invention, such as will enable others skilled in the art to which it appertains to make and use the same.

My invention relates to tension devices for wheels of that class in which the tire comprises an inner inflatable air-tube and an adjustably-wired open sheath or casing—that is to say, a sheath which is separated longitudinally along its inner circumference, so that access can be had to its interior—and provided along the edge portions, which are formed as a result of such longitudinal separation, with hoops having their free overlapping ends connected with adjusting devices whereby the hoops can be adjusted or slackened for the purpose of securing the casing upon the wheel-rim or permitting the casing to be removed from such rim.

The present invention has for its object, among others, to provide an improved device of this character which shall be simple, easily adjusted, and in which the terminals of the hoops are extended inward toward and adjustably connected with the hub.

The invention is applicable to tires of that class such as generally used upon bicycles, automobiles, and light road-wagons, and preferably in connection with pneumatic tires of the type known as the "Dunlop" tire. In lieu of the non-adjustable hoop of this style of tire I provide an adjustable tension-hoop which occupies the same relative position, being incased in the canvas lining of the sheath, the said adjustable hoop having its terminals bent inward toward the center of the wheel and passed through the canvas lining of the sheath and connected with the hub, there being some suitable form of adjustable connection, as turnbuckles interposed between the wheel-rim and the hub, whereby the necessary tension may be placed upon the said hoop.

Other objects and advantages of the invention will hereinafter appear and the novel features thereof will be specifically defined by the appended claims.

The invention is clearly illustrated in the accompanying drawings, which, with the numerals of reference marked thereon, form a part of this specification, and in which—

Figure 1 is a side elevation of a portion of a wheel constructed in accordance with and embodying my present invention, a portion of the wheel-rim and of the tire being represented in section. Fig. 2 is a cross-section passing through the tire and rim of the wheel substantially on the line 2 2 of Fig. 1, extending through the hub of the wheel. Fig. 3 is a section upon an enlarged scale, showing a portion of the rim and illustrating the manner of attaching my improved tension device. Fig. 4 is a view looking at the outer face of the wheel-rim, showing also a portion of the sheath or casing.

Throughout the drawings and specification the same numerals of reference denote like parts.

Referring now to the details of the drawings, 1 represents the rim of a wheel, which may be of any of the well-known forms of construction, except as hereinafter specified, its outer face being dished or concave, as shown, to receive the tire 3, which may be of the well-known Dunlop type or other analogous style of tire.

4 is the hub, and $4^a$ the hub flanges or plates, to which are attached in the usual manner the wire spokes 5. These spokes have their other ends $5^a$ connected in the rim in the usual manner.

6 6 are encircling hoops formed, preferably, of wire, as indicated, a plurality of such hoops being disposed within the sheath or casing $3^a$ of the tire, each hoop being disposed along each inner edge of the casing $3^a$, the extremities of which hoops are formed with the inwardly-projecting extensions 7, which project through the canvas lining $3^b$ of the sheath, and extended, preferably, from diametrically opposite sides of the wheel substantially radially inward toward the hub, though in Fig. 1 for convenience of illustration they are shown as both terminating at the same side of the wheel. These extremities are screw-threaded, as seen at 7ª, for a purpose which will soon appear. The hoops are of such length that when applied to the tire the said extensions pass through holes or openings 8 in opposite sides of the rim, which openings constitute special individuals of the series of openings used for the purpose of applying the usual spokes 5, and, as will be observed, the extensions 7 are such a distance apart that they will pass through alternate openings, so that two openings 8 would be disposed on the same side of the central plane of the wheel and two corresponding openings at the opposite side thereof. The extensions 7 of the ends of the hoop 6 are substantially in alinement with special spokes 9, that are shorter than the usual spokes 5 and provided at their outer ends with screw-threads 10, lying adjacent to the threaded extremities of the extensions 7, and the threads of these extremities of the extensions 7 and the short spokes 9 are of an opposite character—that is, if the extensions 7 are right-hand threads the extremities 10 would be left-hand threads, and vice versa. This arrangement allows of the use of small turnbuckles 11 being employed and applied as indicated best in Figs. 1 and 3, it being understood that by tightening these turnbuckles the hoops 6 will be tightened upon the rim and by loosening the same the hoops may be loosened, so that the sheath and tire may be pulled outside of the concave of the rim for the purpose of repair to the inner tube or for any other desired purpose.

As seen most clearly in Figs. 1 and 4, the hoops 6 are preferably of sufficient length to enable the extremities of each of said hoops to overlap, so that the extensions 7 of each single hoop will pass inwardly through an adjacent pair of openings lying on the same side of the central plane of the rim. It should also be noted that the extensions 7 preferably connect with the body of the band or hoop through a curved portion 12, the edge of the opening 8 being rounded to conform thereto, as seen best in Fig. 3.

Modifications in detail may be resorted to without departing from the spirit of the invention or sacrificing any of its advantages.

Having described my invention, what I claim, and desire to secure by Letters Patent, is—

1. In a pneumatic tire, a sheath or outer tube, having an adjustable open wire hoop within said sheath and having overlapping ends, the terminals of which are bent at their extremities inward toward and connected with the hub.

2. In a pneumatic tire, a sheath or outer tube, a hoop incased therein with its ends bent inward toward the hub, and adjustable means connecting the ends of said hoop with the hub.

3. The combination of a tire, its sheath, a hoop incased in said sheath with its ends bent inward toward the hub, short spokes attached to the hub, and means adjustably connecting the outer ends of the said spokes and the ends of the hoop.

4. In combination, a tire, a hoop incased within the sheath of the tire and held by the sheath, the ends of the hoop being bent toward the hub and passed through the lining of the sheath, short spokes connected with the hub, and turnbuckles adjustably connecting the adjacent ends of the said spokes and the hoop.

5. In a device of the character described, a rim, a tire, a hub, said rim having openings therethrough disposed respectively in planes on opposite sides of the central plane thereof, a hoop inclosed in the sheath of the tire with its ends overlapping and its extremities bent inward and passed through an adjacent pair of openings lying on the same side of said central plane, said extensions having threaded extremities, spokes connected with the hubs and having threaded extremities, and turnbuckles engaging the said threaded extremities of the spokes and hoop.

In witness whereof I have hereunto set my hand in the presence of two witnesses.

EDWARD BROUGHAM.

Witnesses:
 EDITH OLIVER,
 E. C. MACKAY.